(12) United States Patent
Helmin et al.

(10) Patent No.: US 9,091,384 B2
(45) Date of Patent: Jul. 28, 2015

(54) PIPE JACK

(71) Applicants: Joseph R. Helmin, Clearbrook, MN (US); Jessica A. Lobello, Loretto, MN (US)

(72) Inventors: Joseph R. Helmin, Clearbrook, MN (US); Jessica A. Lobello, Loretto, MN (US)

(*) Notice: Subject to any disclaimer, the term of this patent is extended or adjusted under 35 U.S.C. 154(b) by 0 days.

(21) Appl. No.: 14/075,827

(22) Filed: Nov. 8, 2013

(65) Prior Publication Data

US 2014/0124043 A1     May 8, 2014

Related U.S. Application Data

(60) Provisional application No. 61/724,102, filed on Nov. 8, 2012.

(51) Int. Cl.
     *F16L 55/17*          (2006.01)

(52) U.S. Cl.
     CPC .................................. *F16L 55/1705* (2013.01)

(58) Field of Classification Search
     CPC .................................................. F16L 55/1705
     USPC ................. 254/29 A, 29 R, 30; 269/130, 131
     See application file for complete search history.

(56) References Cited

U.S. PATENT DOCUMENTS

| | | | | |
|---|---|---|---|---|
| 1,916,556 A * | 7/1933 | Butt | | 269/97 |
| 2,391,804 A * | 12/1945 | Smith | | 24/278 |
| 2,427,353 A * | 9/1947 | Gagesteyn | | 29/222 |
| 2,557,202 A * | 6/1951 | Gwynne et al. | | 269/201 |
| 2,702,716 A * | 2/1955 | Basolo et al. | | 285/322 |
| 3,070,056 A * | 12/1962 | Hill | | 269/131 |
| 3,586,057 A * | 6/1971 | Lambert | | 138/99 |
| 4,011,979 A * | 3/1977 | Hagen et al. | | 228/49.3 |
| 4,782,577 A * | 11/1988 | Bahler | | 29/525.08 |
| 4,934,673 A * | 6/1990 | Bahler | | 269/43 |
| 5,432,978 A * | 7/1995 | Menke et al. | | 16/426 |

* cited by examiner

*Primary Examiner* — Lee D Wilson
*Assistant Examiner* — Jamal Daniel
(74) *Attorney, Agent, or Firm* — Christensen Fonder P.A.

(57) ABSTRACT

A pipe jack including a sprocket head having radial projections, a hydraulic jack having a ram plunger at a top end and a base at a bottom end, a base plate and a roller chain sized to engage with the radial projections in various embodiments. In one embodiment, arc sprockets are provided in parallel on the sprocket head with each sprocket having a chord, connecting the arc ends, defining a flat surface across the arc sprocket. The chain engages with the arc sprockets and are adjacent and axially offset. The sprocket head having a support plate with a top and bottom surface, the top surface fixedly engaged with the arc sprockets. A receiving tube can be axially centered on and fixedly engaged with the support plate bottom surface. The pipe jack can be used to lift and position a half sole repair sleeve along a pipe to be repaired.

19 Claims, 14 Drawing Sheets

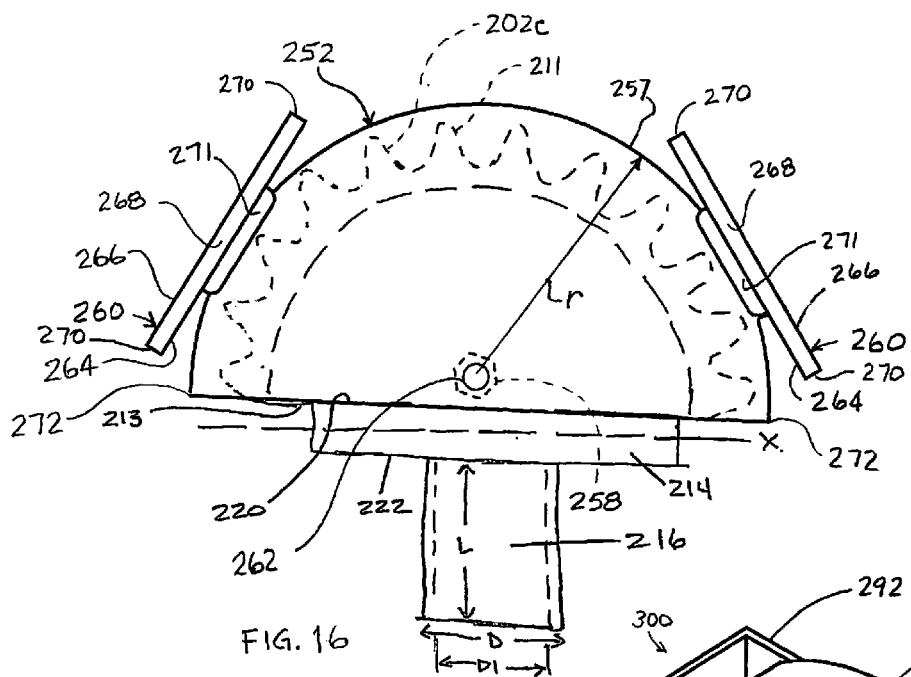
FIG. 16
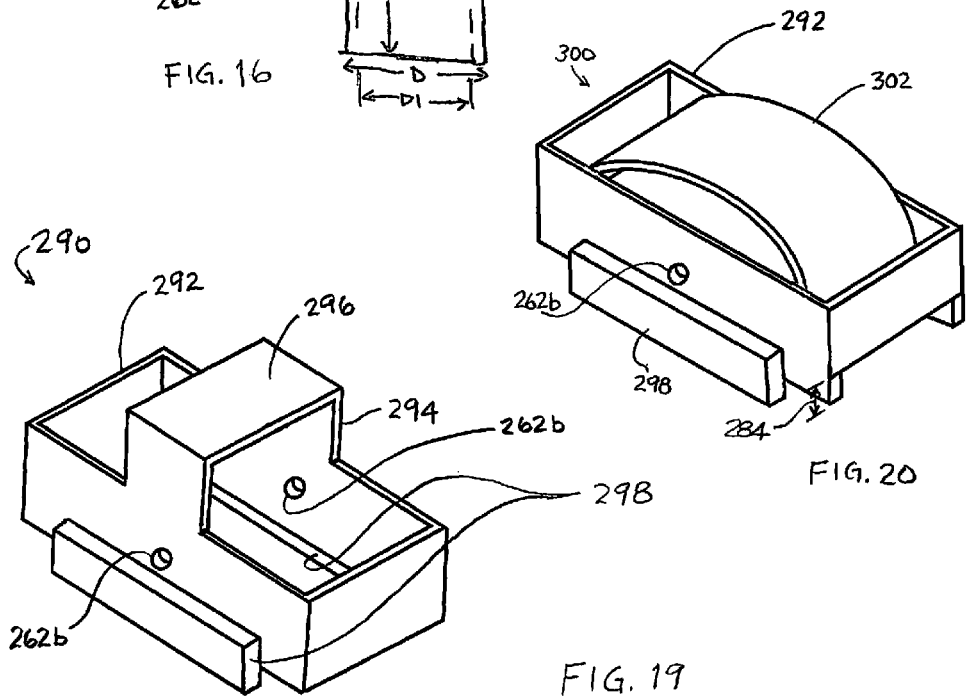
FIG. 19
FIG. 20

PIPE JACK

RELATED APPLICATIONS

This patent application claims the benefit of U.S. Provisional Patent Application No. 61/724,102, filed on Nov. 11, 2012, the disclosure of which is incorporated by reference herein except for express definitions contained therein.

FIELD OF THE DISCLOSURE

The present disclosure relates generally to a pipe jack or pipe lifter. More particularly, the present disclosure relates to a device to position half sole repair sleeves on a pipe.

BACKGROUND

Pipes are used in numerous industries and pipelines are used to carry liquids, viscous materials, slurries, and steam from one location to the next. The pipes can have diameters ranging from an inch or less up to 144 inches or more. Over time, the pipe can become damaged or weakened. Repair of the pipe can involve shutting down the pipeline impacting operational activities and costs. It is known in the pipeline industry to repair the pipe while maintaining operations by installing half sole repair sleeves or split sleeves over the pipe. Once in place, the sleeves can be welded in place or a tightening or compression system can be used to hold the pipe halves together.

Especially in the case of larger diameter pipes, the sleeves are heavy and not easily manipulated. The first issue is getting the sleeve properly positioned in relation to the pipe to allow for the subsequent raising and alignment of the pipe and sleeve. The second issue is simply raising the sleeve which is heavy and cumbersome. The third issue is that once the sleeve is properly situated on the bottom half of the pipe and mated to the top half (or two sleeves each positioned along opposite sides of the pipe and mated), maintaining the positioning of the sleeve can be a challenge. Various methods are used in an attempt to hold the sleeves in position, including, but not limited to, pipe jacks, blocking, strapping, manual means, bracing, machine mounted platforms, etc.

Of the above methods, the use of pipe jacks is well known. An example of one common configuration of a pipe jack is custom made by Allan Edwards, Inc., of Tulsa, Okla., U.S.A. (depicted in FIG. 1). The pipe jack consists of a bracing support block that sits on top of the pipe to be repaired and a raising block that sits atop the bracing support block. A chain is affixed to one side of the raising block and removably attached on the other. A threaded rod is provided in the raising block so that rotation of the rod causes the raising block and bracing support block to separate thus tensioning the chain.

It is an accepted practice with known pipe jacks that the chain must circumferentially follow the pipe and that it must contact the pipe squarely. To achieve this, known pipe jacks are configured so that the ends of the chains, when connected to the lifting device, are coplanar. Thus, when attached, the chain that is looped around the pipe, the lifting head and the chain ends attached to the lifting mechanism are on the same axial plane with the axial plane perpendicular to the longitudinal axis of the pipe. This is intended to prevent twisting of the chain and undue forces on the pipe.

One problem with current pipe jacks is that rotation of the threaded rod results in side forces that can cause instability of the pipe jack. Another problem is that, as the tension on the chain increases, the force required to turn the rod is also increased. There is a propensity for the tightening wrench to slip off of the rod with the increasing force requirement, which can cause injury to the worker. Another problem is that pipe jacks of this type can be heavy and cumbersome to lift in place and to operate. A further problem is that rotation of the threaded rod is not ergonomically conducive.

In view of the shortcomings of known pipe jacks, there is a demand for a pipe jack which is simple to employ but capable of lifting and exerting distributed compression forces against the half sole repair sleeve to effectively position and install the sleeve. In addition, the pipe jack should be easy to use, be easy to manipulate, and remain stable as the half sole sleeves are secured in place.

SUMMARY

Disclosed herein are various embodiments of related to methods, systems and devices for lifting and positioning a half sole repair sleeve along a pipe to be repaired thereby providing improved seating and retention of the sleeve for the subsequent affixing of the sleeve to the pipe. In various embodiments, as the chain is tightened, equal circumferential forces are applied to the pipe while substantially increased forces are not required to further tighten the chain. That is, the force administered to the pipe jack remains fairly constant throughout during the jacking operation. Certain embodiments disclosed herein provide increased accuracy and effectiveness while providing a cost effective, low weight, and easily maneuverable system.

One embodiment described herein includes a pipe jack comprising a sprocket head having radial projections, a hydraulic jack having a ram plunger at a top end and a base at a bottom end, a base plate and a roller chain sized to engage with the radial projections. Additional features can include a plurality of arc sprockets on each sprocket head where the arc sprockets each have a chord defining a flat surface across the arc sprocket, the chord connecting the arc ends, and a support plate having a top surface and a bottom surface where the top surface is fixedly engaged with the chord side of the arc sprockets. A receiving tube is provided that is axially centered on and fixedly engaged with the support plate bottom surface. Additional features can further include the base plate comprising a generally rectangular plate having a curvature and a receiver.

In one embodiment of the pipe jack, the sprocket head is fixedly attached to the hydraulic jack ram plunger and the base plate is fixedly attached to the hydraulic jack base.

Another embodiment of the pipe jack includes a sprocket head where the plurality of arc sprockets is comprised of a pair of arc sprockets in parallel and separated by a fixed distance.

Another embodiment of the pipe jack includes a sprocket head where the plurality of arc sprockets is comprised of two pair of arc sprockets, each arc sprocket separated from and in parallel with its adjacent arc sprocket.

In another embodiment of the pipe jack, the roller chain has two ends and each end is fully removably engaged with a different arc sprocket than the other end. The chain ends each engage with different arc sprockets and are adjacent and axially offset with each other. In another embodiment, the roller chain can be a double roller chain or a triple roller chain.

In certain embodiments, the receiving tube includes an inside diameter complementary to an outside diameter of the ram plunger for removable engagement.

Other embodiments of the pipe jack include a hydraulic jack selected from the group consisting of a manual hydraulic jack, an air hydraulic jack, or an electric hydraulic jack.

In yet another embodiment, a safety hood or guard is dimensioned such that it fits over the sprocket head and retains the chain on the sprockets. The safety hood has two end plates and at least one guard plate. The safety hood is attached to the sprocket head with at least one fastener. The end plates are generally identical in configuration and are axially centered and parallel to each other with the guard plate spanning the area between the end plates and fixedly attached to the end wall of each end plate.

The embodiments disclosed herein include all combinations of the features or elements described herein, not just the particular combinations illustrated, described or claimed.

BRIEF DESCRIPTION OF THE DRAWINGS

FIG. 16 is a side view of a safety guard or hood in an embodiment of the disclosure;

FIG. 19 is a perspective view of a spanning safety hood in an embodiment of the disclosure; and FIG. 20 is a perspective view of a dome-in-chassis safety hood in an embodiment of the disclosure.

DETAILED DESCRIPTION OF THE DRAWINGS

Figure 1:
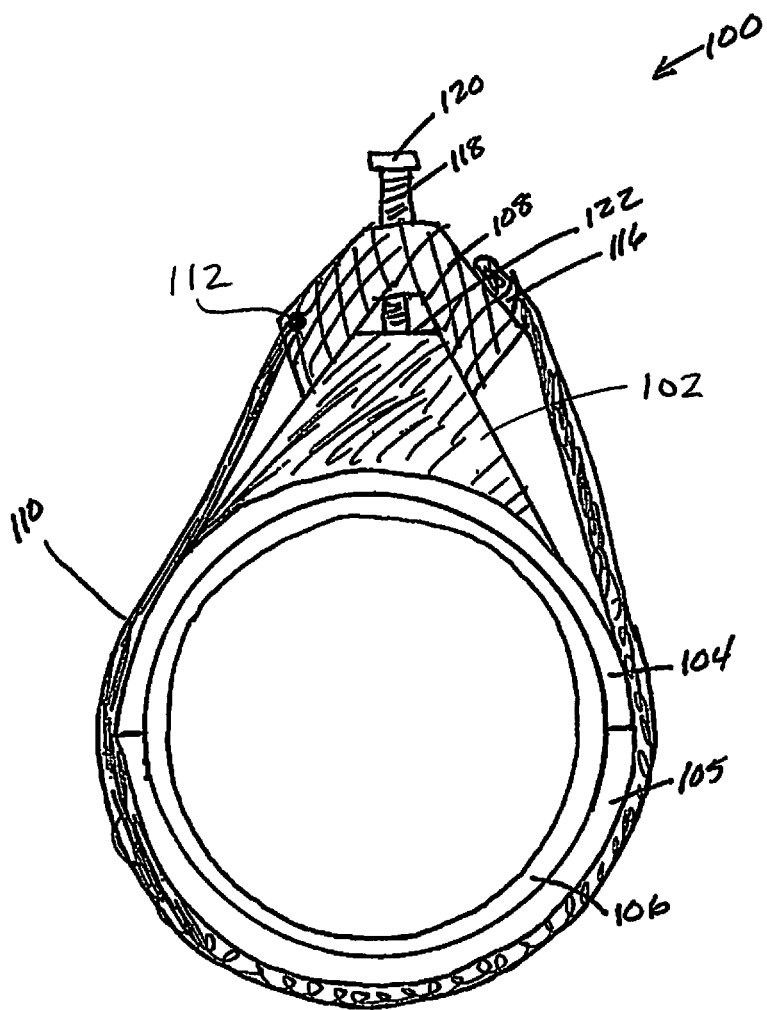
FIG. 1 is an elevation of a pipe jack of the prior art.
Figure 2:
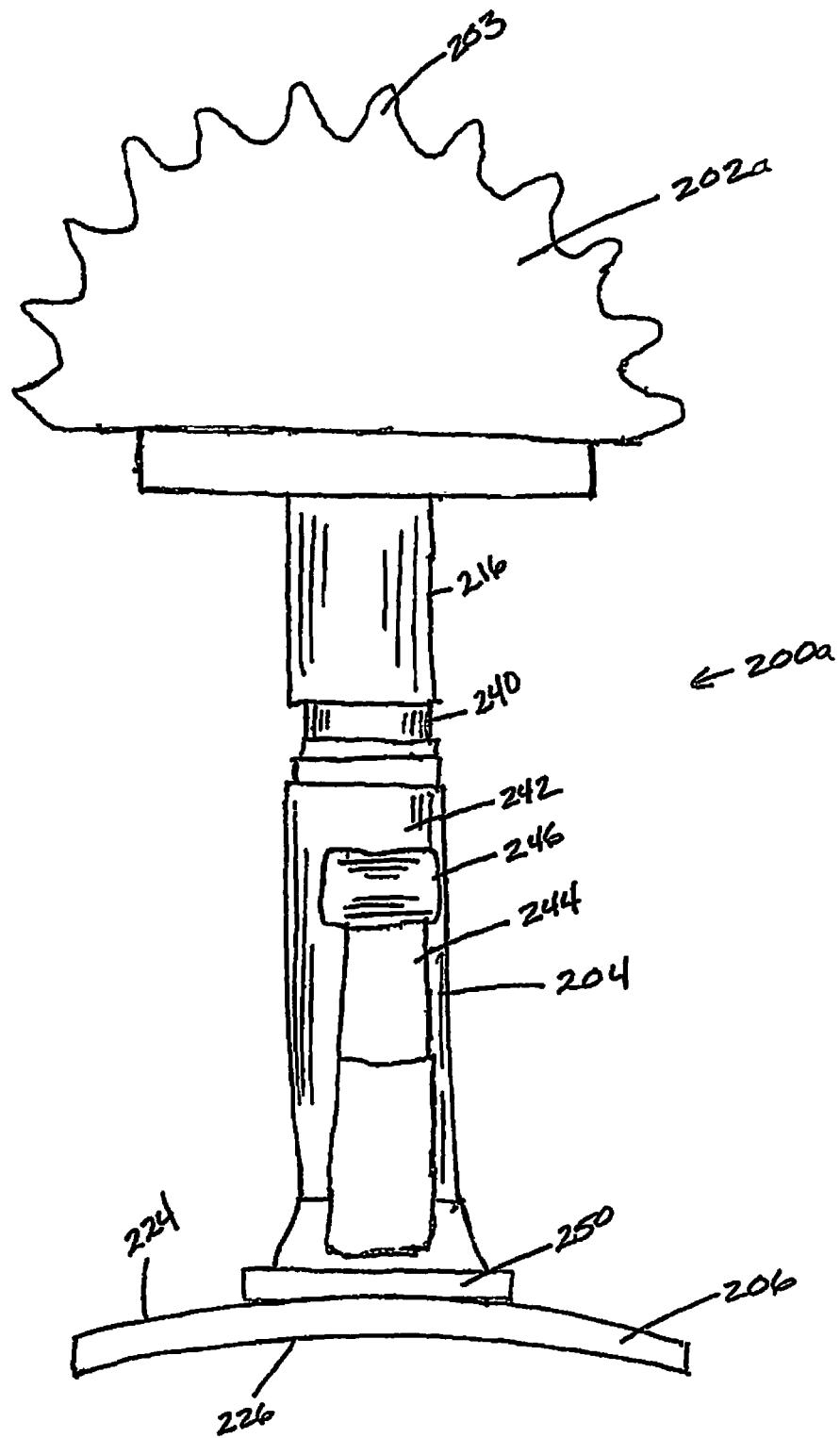
FIG. 2 is a front view of a pipe jack in an embodiment of the disclosure.
Figure 3:
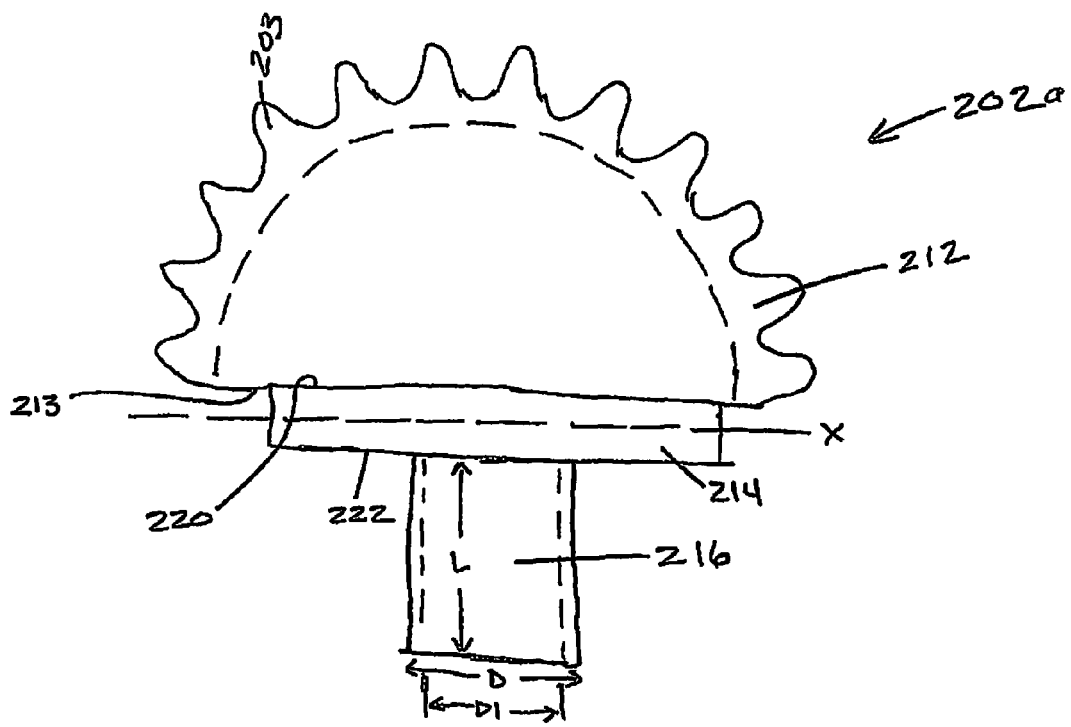
FIG. 3 is a side view of the sprocket head of the pipe jack of FIG. 2.

A known pipe jack 100 is illustrated in FIG. 1. The pipe jack 100 is comprised of a bracing support block 102, a raising block 108, a roller chain 110, and a threaded rod 120. The bracing support block 102 is triangular in shape and sits on the top portion of a half sole repair sleeve 104 which is positioned on a pipe 106 be repaired. Adjacent the top of the bracing support block 102 is a raising block 108 that is a generally upside down "V" shape. One end of a chain 110 is fixedly attached to one side of the "V" via a pin 112 or other methods of attachment. The other end of the chain 110 is removably attached to at least one hook 116 on the opposite side of the "V" so that the two ends of the chain are coplanar along an axis of the raising block 108. Also, within the raising block 108, at the apex of the "V", is a threaded rod 118 that extends through the block 108. The top end of the rod has a hex head 120 and the bottom end 122 of the rod rests on the bracing support block 102.

In operation, the loose end of the chain 110 is routed around the half sole repair sleeve 105 and attaches to the hooks 116 on the raising block 108. Thus, the chain 110, the raising block 108 and the chain ends are on the same axial plane with the axial plane perpendicular to the longitudinal axis of the pipe. A worker turns the threaded rod 118 using a wrench on the hex head 120 which forces the raising block 108 upwards and away from the bracing support block 102 resulting in tightening of the chain 110 and the positioning of the half sole repair sleeve 105 against the pipe 106.

Referring to FIGS. 2 through 6, a pipe jack 200a is depicted in a disclosed embodiment. The pipe jack 200a is comprised of a sprocket head 202a, a hydraulic jack 204, a base plate 206, and a roller chain 208. The sprocket head 202a has radial projections 203 that engage the roller chain 208. In one embodiment, the sprocket head 202a, hydraulic jack 204, and base plate 206 can be fixedly attached so that the pipe jack 200a is a single cohesive or integrated unit. In another embodiment, the sprocket head 202a, hydraulic jack 204, and base plate 206 are made to complement each other to be modular so that the pipe jack 200a can be assembled and disassembled thus allowing different sized components or components of different ratings to be used interchangeably.

Figure 4:
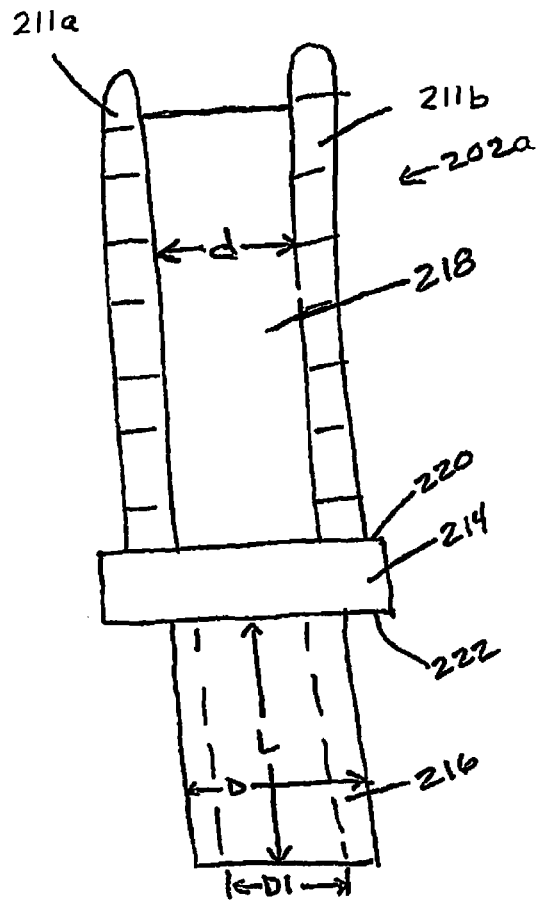
FIG. 4 is a front view of the sprocket head of the pipe jack of FIG. 2.
Figure 5:
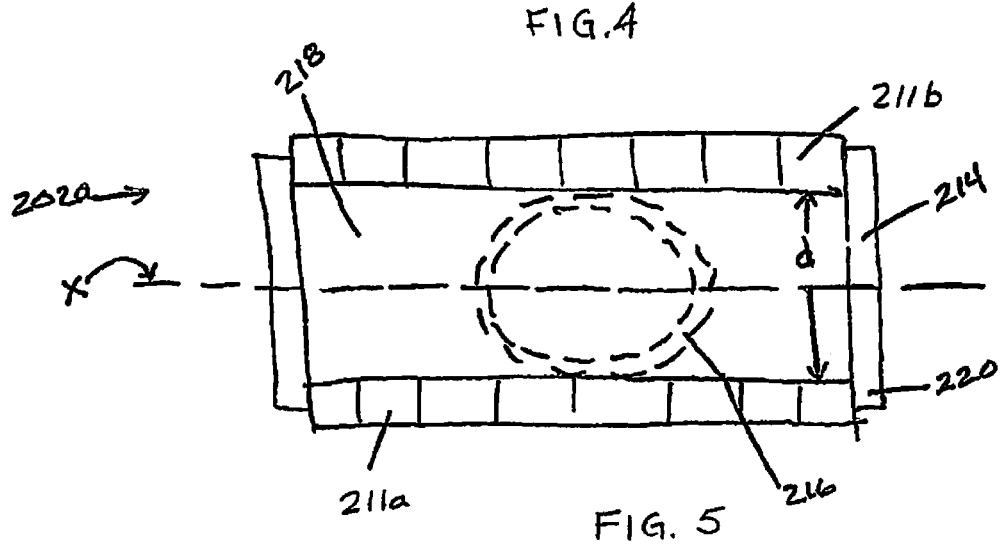
FIG. 5 is a top view of the sprocket head of the pipe jack of FIG. 2.
Figure 6:
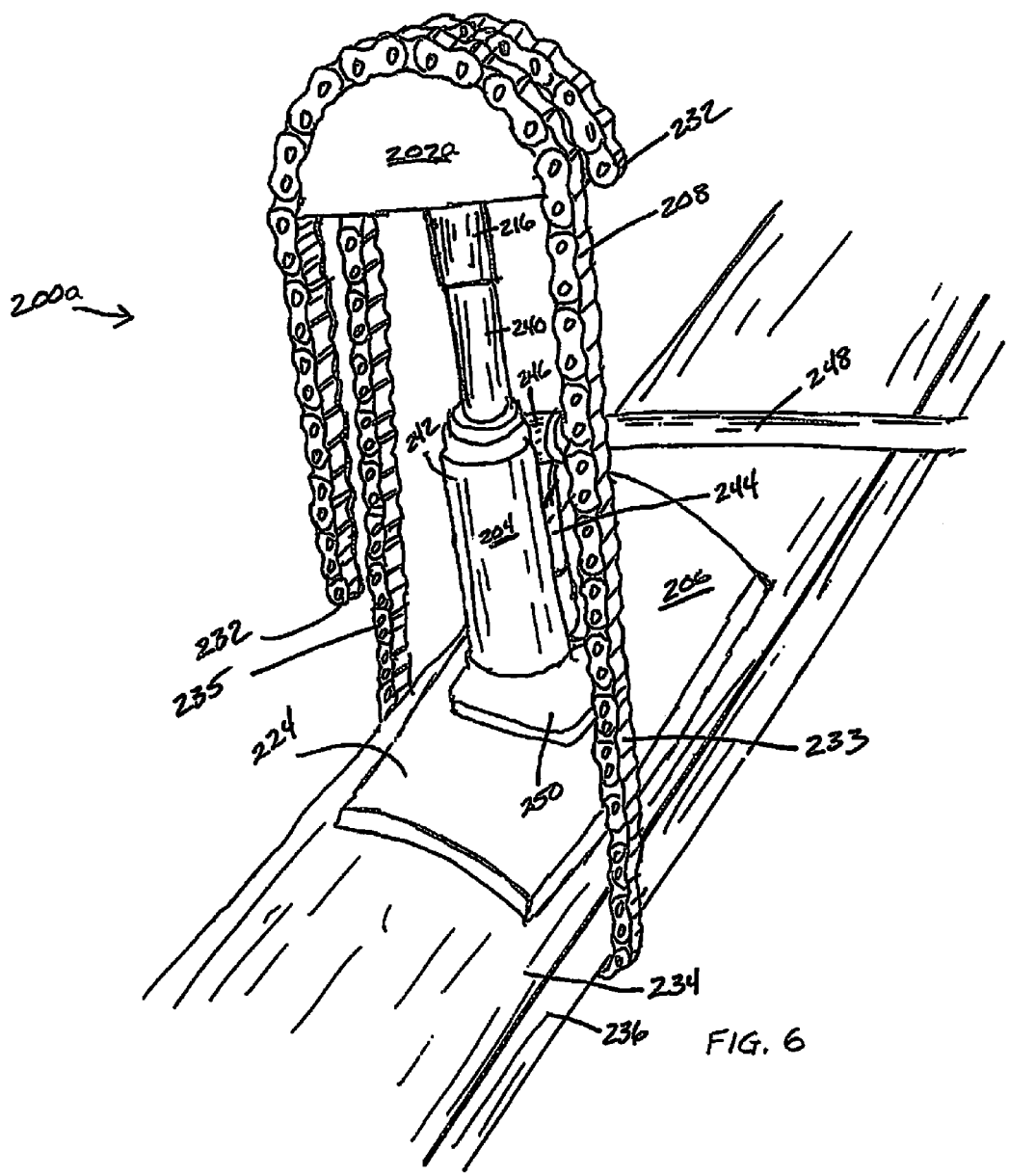
FIG. 6 is a perspective view of an assembled pipe jack in operation in an embodiment of the disclosure.

As depicted in FIGS. 4 and 5, the sprocket head can include of a pair of arc sprockets 211a and 211b (referred to collectively as arc sprocket pair 211). The sprocket head 202a can further comprise a support plate 214 and a receiving tube 216. The support plate 214 is generally a rectangular cuboid but can be any shape. The support plate 214 has a top or first surface 220 and a bottom or second surface 222, and defines a longitudinal x-axis that is substantially parallel to the flow axis of the pipe under repair. The arc of the arc sprocket pair 211 can be a minor arc, a major arc, or a semi-circle. In one embodiment, each sprocket 211a and 211b has a chord side 213 that is flat or linear and terminates the arc ends on the circumference of the sprocket. The two sprockets 211a, 211b can be fixedly attached to the top surface 220 of the support plate 214 so that their chord sides 213 are parallel to the longitudinal x-axis of the support plate 214 and the arc sprockets 214 are generally parallel to each other and separated by a distance d. A filler plate 218 can be provided between the sprockets 211a and 211b that traverses the distance d and is fixedly attached therein. The sprocket pair 211 can be attached so that they are flush with the side of the support plate 214. However, it is understood that the sprocket pair 211 can be attached at any location on the support plate 214.

Figure 7:
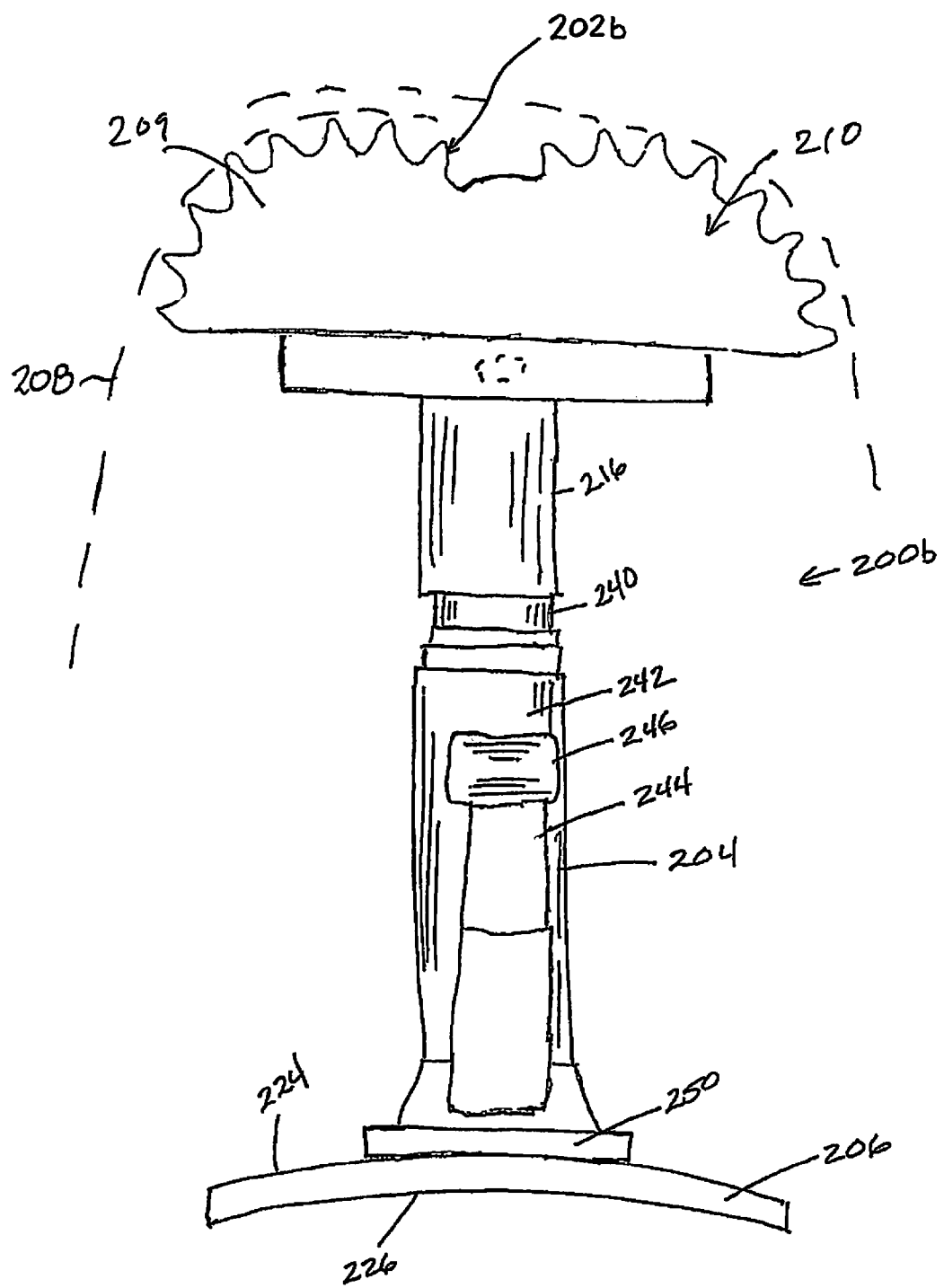
FIG. 7 is a front view of a pipe jack in an embodiment of the disclosure.
Figure 8:
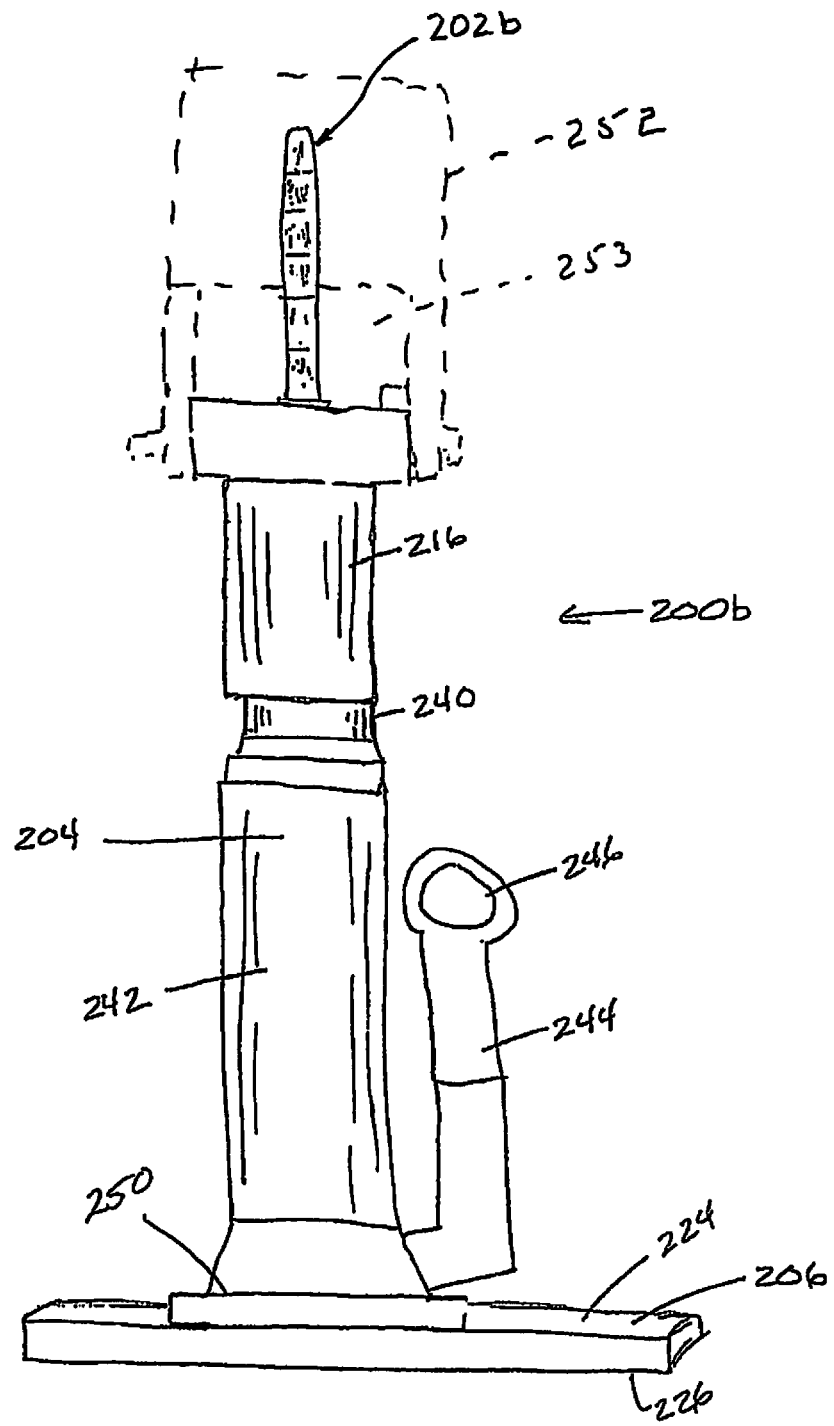
FIG. 8 is a side view of a pipe jack of FIG. 7.

Referring to FIGS. 7 and 8, a pipe jack 200b including a sprocket head 202b is depicted in a disclosed embodiment. The sprocket head 202b includes a pair of sprocket portions 209 and 210 that are in coplanar alignment. One chain end can attach to one sprocket portion the other chain link end can attach to the other sprocket portion. One end of the chain can overlap the other, as depicted in FIG. 7.

Herein, the various embodiments of the pipe jacks of the disclosure are referred to generically or collectively with numerical reference 200, and individually with the numerical reference prefix of 200 followed by a unique letter suffix (e.g., 200a, 200b and so on). Likewise, the various embodiments of the sprocket heads are referred to generically or collectively with numerical reference 202, and individually with the numerical reference prefix of 202 followed by a unique letter suffix (e.g., 202a, 202b and so on).

Figure 9:
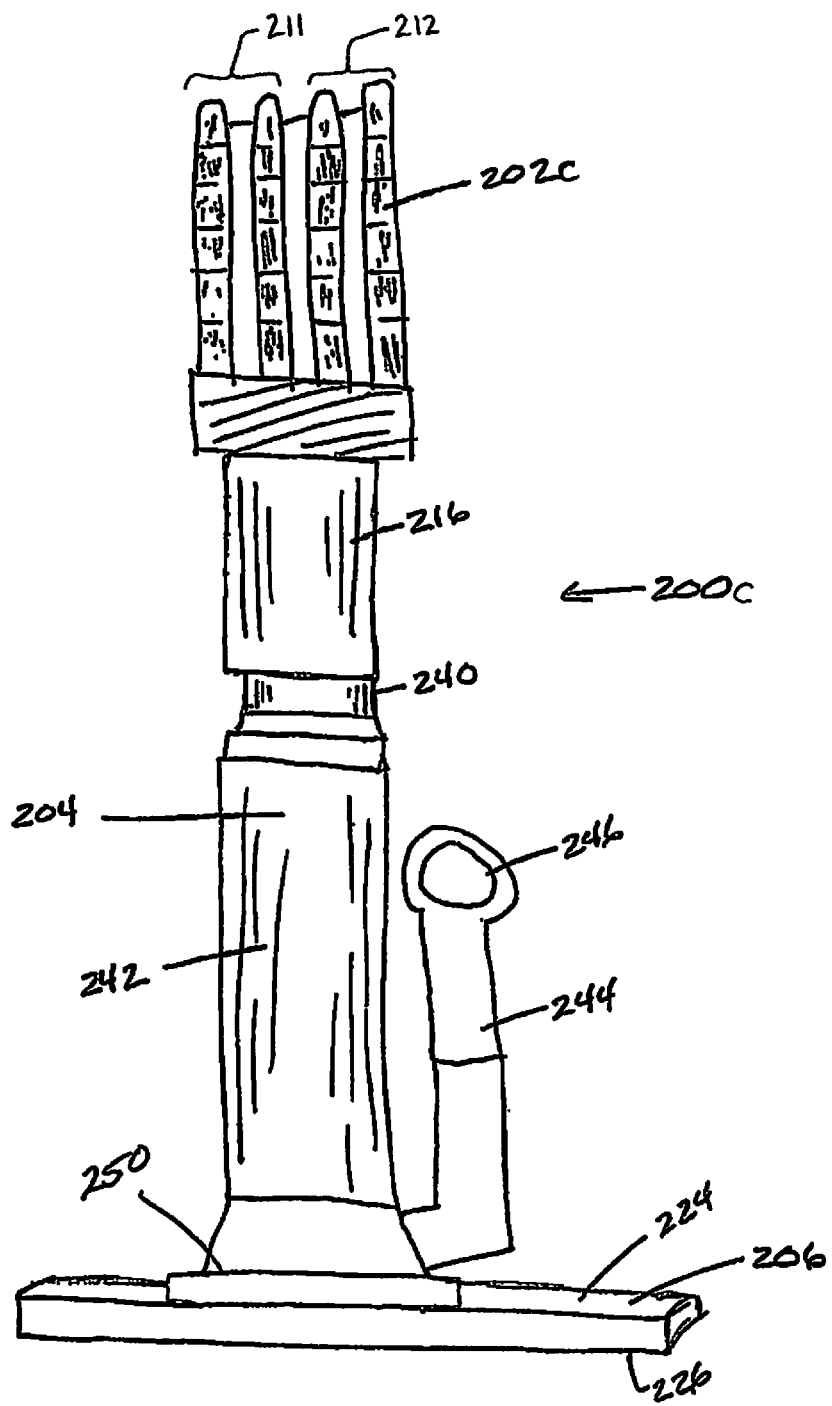
FIG. 9 is a front view of a pipe jack in an embodiment of the disclosure.
Figure 10:
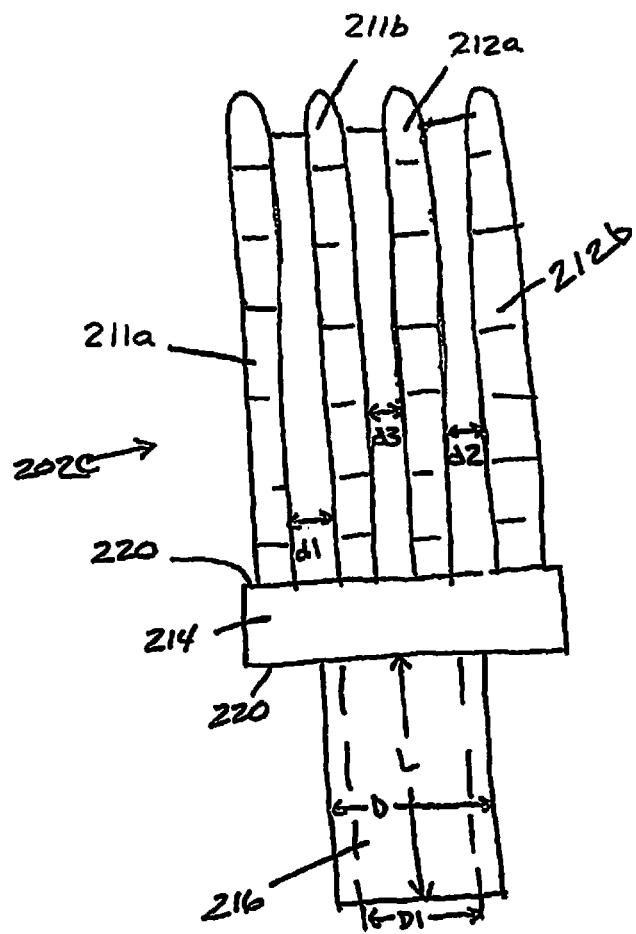
FIG. 10 is a front view of the sprocket head of FIG. 9.
Figure 11:
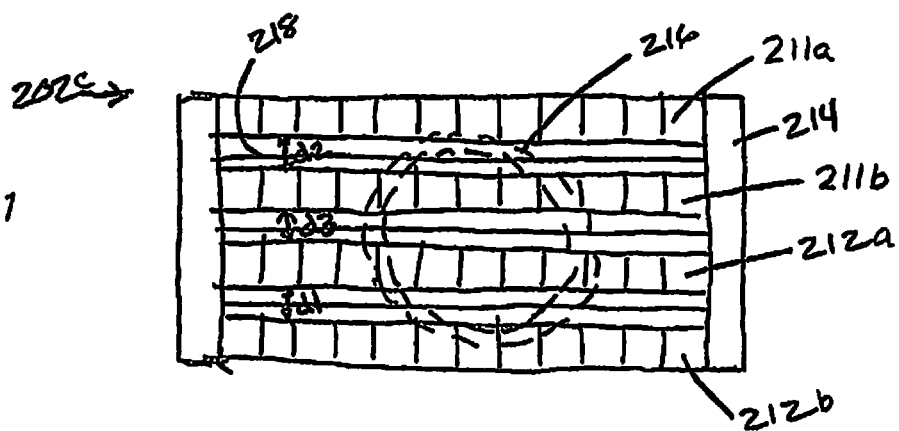
FIG. 11 is a top view of the sprocket head of FIG. 9.

Referring to FIGS. 9 through 11, a pipe jack 200c including an arc sprocket head 202c with double arc sprocket pairs 211 and 212 is depicted in a disclosed embodiment. In addition to the arc sprockets 211a and 211b of the arc sprocket pair 211, the arc sprocket head 202c includes an additional arc sprocket pair 212 comprising arc sprockets 212a and 212b. The arc sprocket head 202c can further include a support plate 214 and a receiving tube 216. The distances d1, d2 between the sprockets 211a and 211b and 212a and 212b of sprocket pairs 211 and 212, respectively, can be comparable. In some embodiments, the distances d1, d2 are dimensioned to accommodate a double roller chain. The sprocket pairs 211 and 212 can be generally parallel to each other. Filler plates 218 can be disposed between and fixedly attached to the sprocket pairs 211 and 212 to define the distances d1, d2, d3.

The receiving tube 216 of the sprocket head 202c can have a fixed outer diameter D that is less than the width of the support plate 214. The length L of the receiving tube 216 can vary. The axial center of the receiving tube 216 can be substantially centered on the bottom surface 222 of the support plate 214 and fixedly attached thereto. The inner diameter D1 of the receiving tube 216 can be chosen so that the ram plunger 240 of the hydraulic jack 204 is received within the tube and fittingly engaged therein. A ram plunger 240 includes the saddle (not shown) of the hydraulic jack 204. In one embodiment, the receiving tube 216 and the ram plunger 240 can be fixedly engaged by, for example, welding. In another embodiment, the receiving tube 216 inner diameter and ram plunger 240 outer diameter are sized to so that the ram plunger 240 matingly engages within the receiving tube 216 and are subsequently able to be disengaged from each other.

The hydraulic jack 204 can be operated manually, by air, or by electricity to raise and lower the ram plunger 240. The hydraulic jack 204 can include a ram plunger 240, including the saddle, a main body 242, a lever arm 244, a handle sleeve 246, a handle 248, and a base 250. In some embodiments, the ram plunger 240 can be telescopic. In manual operations, the lever arm 244 is rotated forwardly and backwardly through one range of circular degrees. The forward or downward stroke raises the ram plunger 240. Thus, when raising the ram plunger 240, a downward force is carried through the hydraulic jack 204, through the base plate 206 and into the pipe, providing a stability in the downward direction. In certain embodiments, the hydraulic jack 204 can be of any type, for example, an off-the-shelf bottle jack. Bottle jacks are available rated at 2-50 tons, sufficient for lifting the weight of the half sole repair sleeve.

Figure 12:
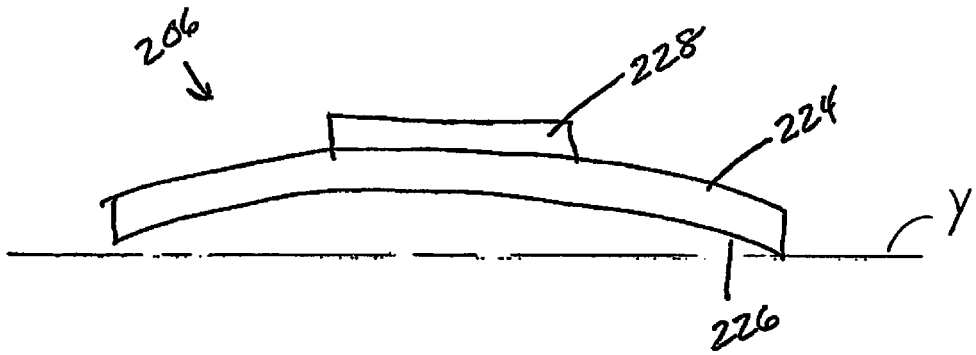
FIG. 12 is a side view of a base plate in an embodiment of the disclosure.
Figure 13:
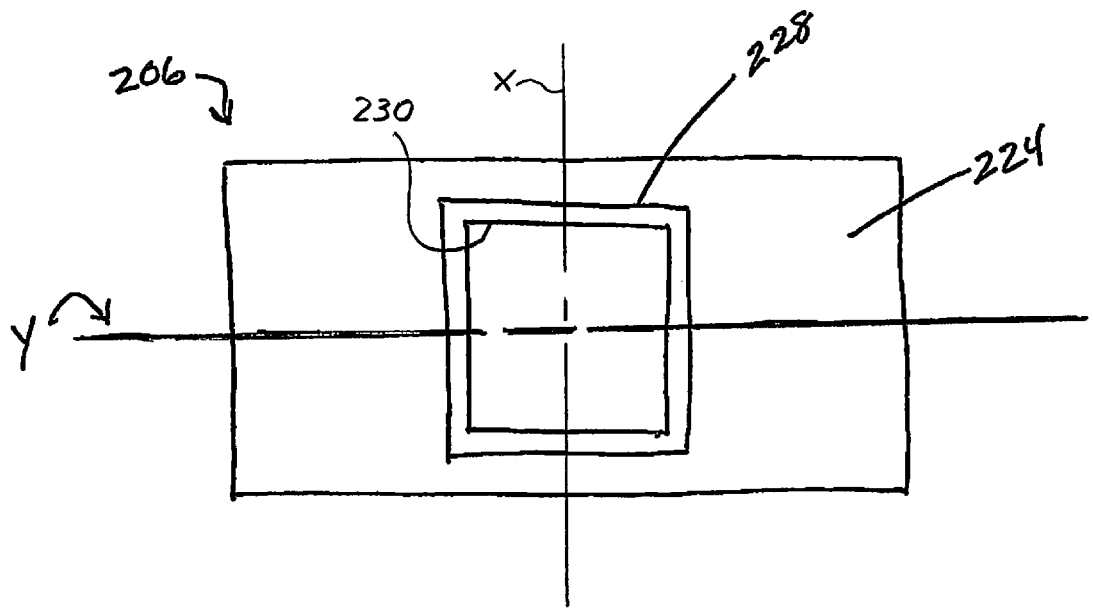
FIG. 13 is a top view of the base plate of FIG. 12.

Referring to FIGS. 12 and 13, a base plate 206 is depicted in an embodiment of the disclosure. The base plate 206 includes a top surface 224 and a bottom surface 226. The bottom surface 226 can define a curvature along the lateral y-axis that is substantially complementary to the curvature of the half sole repair sleeve or the curvature of the pipe to be repaired. The lateral y-axis of the base plate 206 is perpendicular to the longitudinal x-axis of the support plate 214. The top surface 224 is provided with a plate receiver 228 that defines a pocket 230 configured to receive the base 250 of the hydraulic jack 204. In one embodiment, the hydraulic jack 204 can be fixedly attached to the plate receiver 228 by, for example, welding or fasteners. In another embodiment, the hydraulic jack 204 can be removably housed within the pocket 230. The hydraulic jack 204 can be temporarily restrained in the pocket 230 by, for example, frictional forces, clamps, or pins.

The various pipe jacks 200 provide lift to a half sole repair sleeve 236 via a roller chain 208, the roller chain 208 and the radial projections 203 of the arc sprockets 211, 212 being complementary. In one embodiment, the roller chain 208 is a single roller chain. In other embodiments, the roller chain 208 can be a double or triple roller chain. The roller chain 208 can be provided in various lengths to accommodate the circumference of the pipe to be repaired. In the depicted embodiment, the ends 232 of the roller chain 208 are free. In other embodiments, one end of the roller chain 208 can be permanently attached to a given sprocket head 202. The roller chain 208 is positioned around the pipe to be repaired so that the ends 232 each engage with different sprockets so that a first portion of chain 233 engaged with a first sprocket is offset in relation to the axial plane where the axial plane is perpendicular to the longitudinal axis of the pipe and a second portion of chain 235 engaged with a second sprocket is offset on the opposite side of and in relation to the axial plane. The ends 232 of the roller chain 208, the chain loop, and the sprocket 212 are thus not coplanar to each other.

In operation, the pipe jack 200 is positioned on the top of the pipe to be repaired. A half sole sleeve repair (e.g., item 234 of FIG. 6) can be placed between the pipe jack 200 and the pipe being repaired. A half sole repair sleeve (e.g., item 236 of FIG. 6) is placed beneath the pipe to be repaired and the roller chain 208 is positioned around the half sole repair sleeve. For embodiments implementing the end-to-end sprockets 209 and 210, the chain ends 232 are in line with each other and/or overlap. For embodiments implementing parallel the sprockets 211a and 211b, the chain ends 232 are brought along opposite sides of the pipe with the first chain end 232 being fully engaged with one arc sprocket 211a and the second chain end 232 being fully engaged with the other arc sprocket 211b so that the chain ends 232 are not coplanar and so that the chain 208 has minimal slack between the pipe jack 200 and the pipe. The hydraulic jack 204 ram plunger 240 is then raised, causing the sprocket head 202 to raise and further tighten the chain 208. Once all slack is removed from the chain 208, the continued raising of the ram plunger 240 and sprocket head 202 causes the half sole repair sleeve to be raised in position against the pipe to be repaired. For embodiments utilizing hydraulic jacks, the sleeve can be raised with essentially infinite resolution.

Functionally, the various embodiments of the pipe jack 200 provide overall stability of the hydraulic jack 204. In the embodiment, where the hydraulic jack 204 ram plunger 240 is manually raised, an up and down force is applied rather than a side force thus limiting any rotational force on the pipe jack 200 and providing a base for containment of downward forces. Another advantage is that, as the tension on the chain increases, the increase in force a worker must use to pump the hydraulics and raise the ram plunger 240 is only marginally increased. Additionally, because the lever arm 248 resides in a handle sleeve 246, there is little danger of the lever arm 248 slipping and causing injury to a worker. Another advantage is that the pipe jack 200 can be made to be lightweight and therefore is easily lifted into place, particularly for embodiments where the pipe jack 200 is modular. Another advantage is the ergonomics of using a pumping action. Further advantages are achieved where the raising action is accomplished via air or electricity, including, but not limited to, safety considerations and ergonomic concerns.

Figure 14:
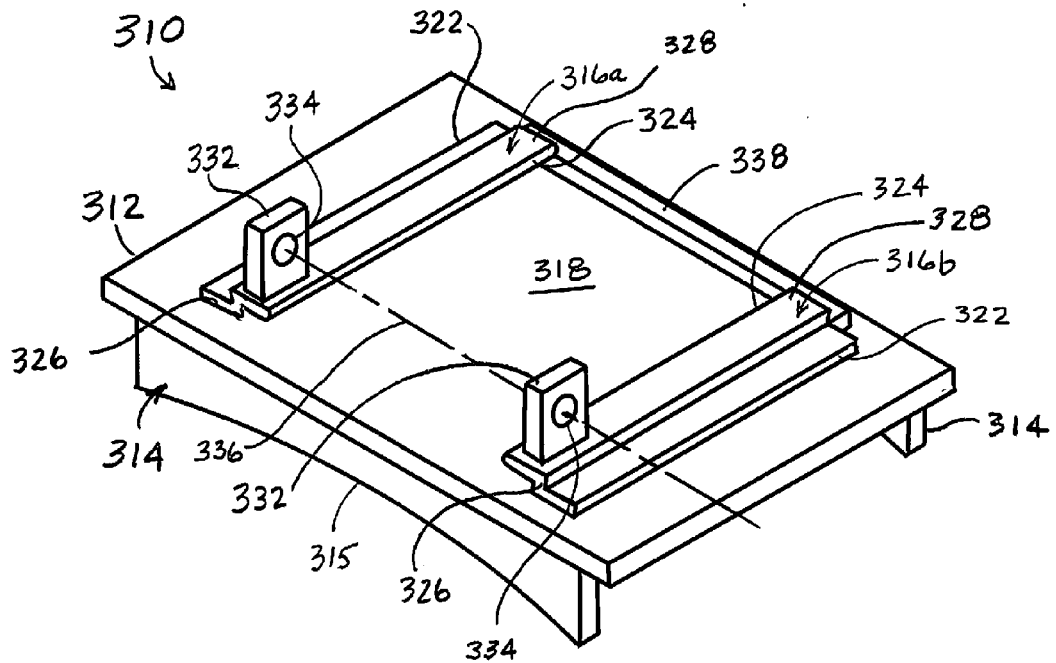
FIG. 14 is a perspective view of a base plate assembly in an embodiment of the disclosure.
Figure 15:
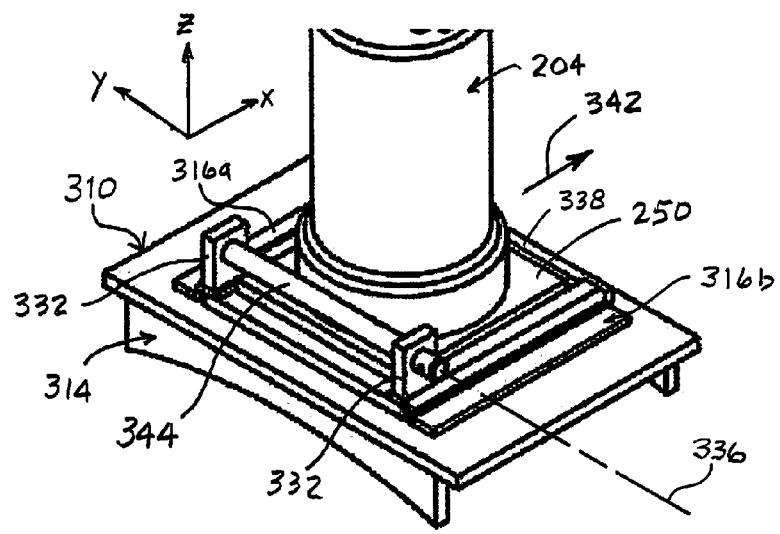
FIG. 15 is a perspective view of the base plate assembly of FIG. 14 with a hydraulic jack installed thereon.

Referring to FIGS. 14 and 15, a mounting plate assembly 310 is depicted in an embodiment of the disclosure. The mounting plate assembly 310, which can be implemented in the alternative to base plate 206, includes a platform 312 supported by a plurality of saddle plates 314. The saddle plates 314 can include an arcuate surface 315 for better coupling of the mounting plate assembly 310 on the surfaces of pipes or half sole repair sleeves.

In one embodiment, a pair of offset flanges 316a and 316b are disposed on a mounting surface 318 of the platform 312. Each offset flange 316a, 316b can include a base portion 322 that is coupled to the platform 312 and a raised portion 324 that extends upwards and laterally inwards toward the center of the mounting surface 318. Each offset flange 316a, 316b can also be characterized as having a proximal end portion 326 and a distal end portion 328. A pin tab 332 can extend upwards from the proximal end portion 326 of each respective offset flange 316a, 316b. The pin tabs 332 can each include structure that defines a through hole 334, the through holes 334 of the pin tabs 332 being concentric about a common axis 336. In one embodiment, a stop bar 338 is disposed on the mounting surface 318 of the platform 312 proximate the distal end portions 328 of the offset flanges 316a, 316b.

In assembly, the hydraulic jack 204 is aligned at the proximal end portions 326 of the offset flanges 316a and 316b so that the edges of the base 250 can pass between the offset flanges 316a and 316b. The hydraulic jack 204 is then slid along the mounting surface 318 such that the edges of the base 250 are slid under the raised portions 324 of the offset flanges 316a and 316b, in the direction toward the stop bar 338 (indicated by arrow 342). The hydraulic jack 204 can be slid toward the distal ends portions 328 of the offset flanges 316a and 316b until a transverse edge of the base 250 registers against the stop bar 338. A securing pin 344 can then be fed through the through holes 334 of the pin tabs 332 along the common axis 336 to traverse the gap between the pin tabs 332.

Functionally, the offset flanges 316a and 316b, the stop bar 338 and the securing pin 344 cooperate to limit the motion of the hydraulic jack 204. The offset flanges 316a and 316b restrain motion of the flange 250 (and therefore the hydraulic jack 204) in the direction of the lateral y-axis as well as in a normal z-axis direction that is normal to the platform 312. The offset flanges 316a and 316b, as well as the stop bar 338, also act to limit rotation of the hydraulic jack 204 about the normal z-axis. The stop bar 338 and the securing pin 344 cooperate to limit motion of the hydraulic jack 204 in the direction of the longitudinal x-axis.

Figure 17:
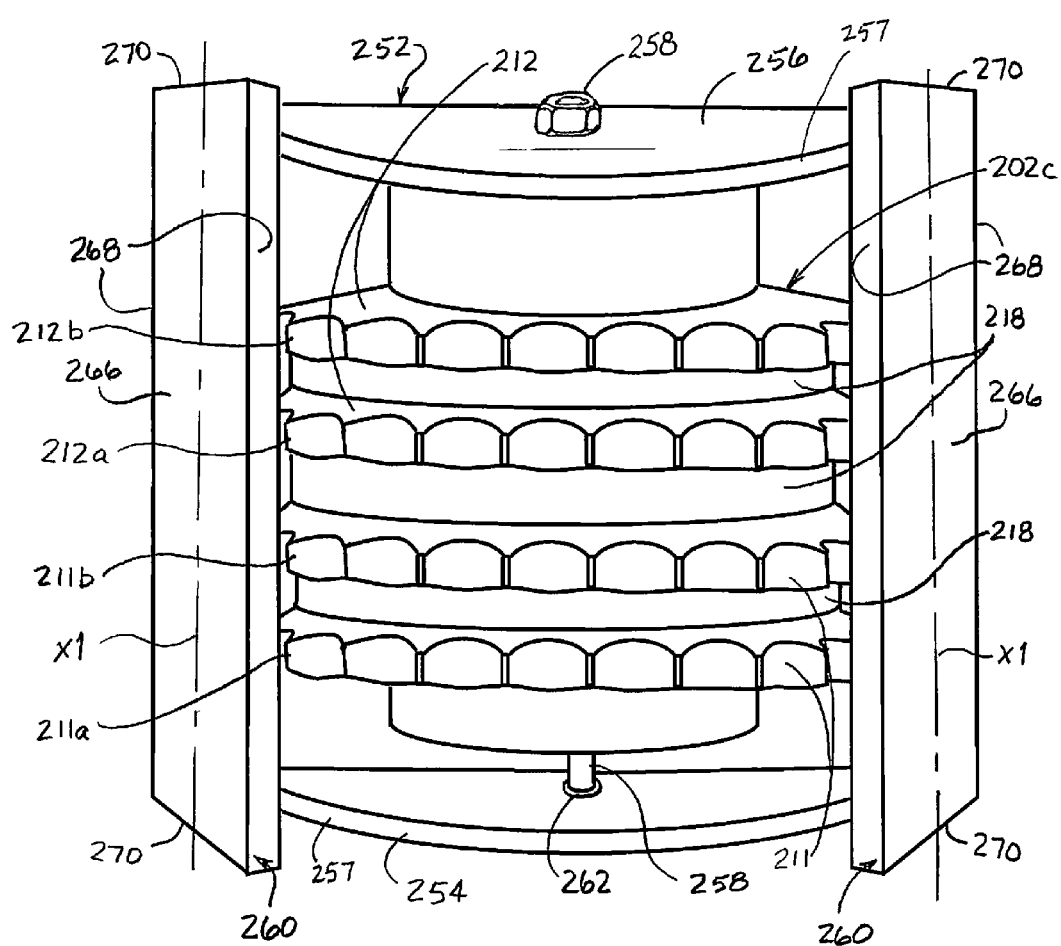
FIG. 17 is a top view of the safety guard or hood of FIG. 16.

Referring to FIGS. 16 and 17, a safety hood 252 is depicted in a disclosed embodiment. The safety hood 252 can include a first end plate 254, a second end plate 256, at least one fastener 258, and at least one guard plate 260. The first end plate 254 and second end plate 256 can be semi-circular with a radius r that is larger than the radius of the arc sprocket pair(s) 211, 212. The arc of the end plates 254, 256 each define an outer peripheral edge 257. The end plates 254, 256 and sprocket head 202 can include structure defining a passage 262 that passes through the assembly for insertion of a fastener 258. The fastener 258 can removably attach the safety hood 252 to the sprocket head 202. The fastener 258 is depicted in phantom in FIG. 16 as a hex head bolt/nut, but any type of fastener 258 can be used (e.g., machine screws, pins, clips, hook and eye, a latching mechanism). It is understood that the use of other types of fasteners may not require an opening in the end plates 254, 256.

Each guard plate 260 includes a bottom surface 264, a top surface 266, lateral edges 268, and axial edges 270. The safety hood 252 is depicted as having the two guard plates 260 but it is understood that any number of guard plates 260 can be included. In one embodiment, guard plates 260 can be generally rectangular in shape and can each define a cross axis x1 that is generally orthogonal to the longitudinal x-axis.

The end plates 254, 256 can be generally aligned along the passage 262 and parallel with each other. Each guard plate 260 can be fixedly attached to the end plates 254, 256, for example by a weld bead 271 as depicted in FIG. 16. In the depicted embodiment, the cross axis x1 is substantially perpendicular to the axial planes of the end plates 254, 256, and the bottom surface 264 proximate the lateral edges 268 contact the peripheral edge 257 of the end plates 254, 256. The guard plates 260 can be fixedly attached at any location along the circumference of the end plates 254, 256. In one embodiment, the guard plates 260 are attached proximate the arc ends 272 of the end plates 254, 256. The guard plates 260 can also partially encompass the end walls 257 of the end plates 254, 256. In another embodiment (not depicted), the guard plates 260 totally encompass the peripheral edges 257 of the end plates 254, 256.

The safety hood 252 is dimensioned so that it fits over the sprocket head 202. In one embodiment, when the roller chain 208 is on the arc sprocket 212, the distance between the bottom surface 264 of the guard plate 260 and the chain 208 is such that the roller chain 208 cannot lift off the arc sprocket pairs 211, 212 when the safety hood 252 is in place. In some embodiments, the safety hood 252 can be dimensioned to make contact with the roller chain 208, such that the guard plate 260 exerts a clamping force on the roller chain 208 when the safety hood 252 is in place.

In operation, the safety hood 252 can be placed over the sprocket head 202 once the roller chain 208 is in place. The safety hood 252 can be mounted or dismounted from the sprocket head 202 at any time during the operation of the pipe jack 200. An advantage of the safety hood 252 as described above is that the roller chain 208 cannot be removed from the arc sprocket pair(s) 211, 212 while the safety hood 252 is in place, thereby militating against chain slip-offs and enhancing the safety aspect of the pipe jack 200.

The safety hood 252 is illustrated in FIGS. 16 and 17 as being deployed over double arc sprocket pairs 211 and 212. The co-planar sprockets 209 and 210 of sprocket head 202b can also utilize a safety guard 252, as illustrated in phantom in FIG. 8 and having opposing windows 253 for passage of the roller chain 208.

Figure 18:
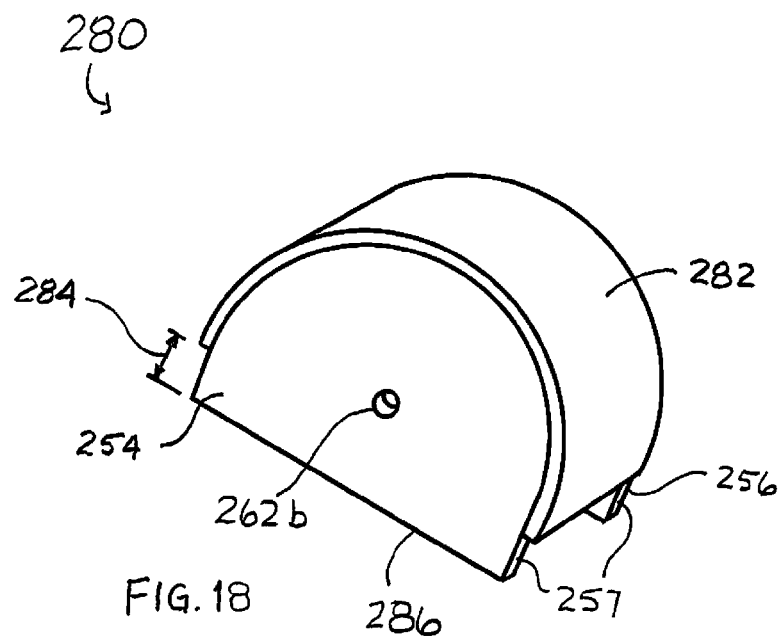
FIG. 18 is a perspective view of a domed safety hood in an embodiment of the disclosure.
Figure 18A:
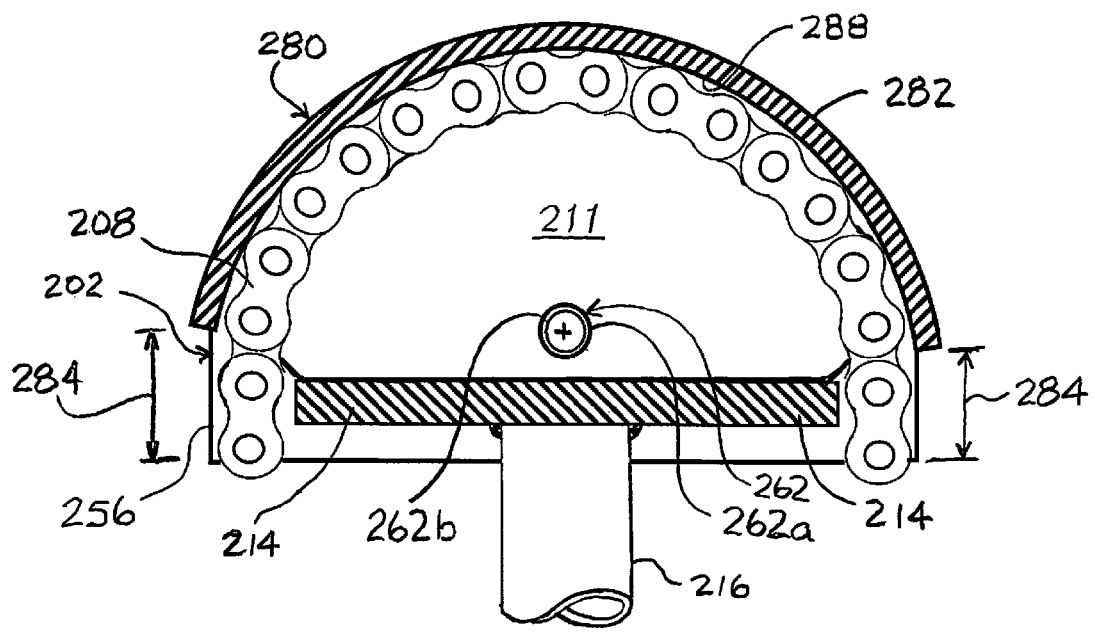
FIG. 18A is a sectional view of the domed safety hood of FIG. 18.

Referring to FIGS. 18 and 18A, a domed safety hood 280 is depicted in a disclosed embodiment. The domed safety hood 280 includes many of the same components as the safety hood 252, which are indicated with like-numbered numerical references. The domed safety hood 280, however, comprises an arcuate guard plate 282 that bridges the end plates 254 and 256. The arcuate guard plate 282 can be a single piece (as depicted) or a plurality of pieces (not depicted) that are arranged end to end. In one embodiment, the arcuate guard plate(s) 282 have an arcuate dimension and are located on the end plates 254 and 256 so that offset windows 284 are defined proximate the bottom portion 286 of the domed safety hood 280.

The domed safety hood 280 is depicted in assembly with the sprocket head 202 in FIG. 18A. The FIG. 18A depiction also presents the passage 262 as being defined by two structures: passage 262a, which is bored through the sprocket head 202, and passages 262b, which are bored through the end plates 254 and 256. In one embodiment, the domed safety hood 280 is dimensioned so that when passages 262a and 262b are concentrically aligned, an interior surface 288 of the arcuate guard plate(s) 282 are in clamping contact with the roller chain 208.

In operation, the pipe jack 200 is mounted to the pipe under repair and the roller chain 208 mounted to the sprocket head 202 as described above. The domed safety hood 280 is then placed over the sprocket head 202 and brought into clamping contact with the roller chain 208 until the passages 262a and 262b are brought substantially into alignment. A pin (e.g., fastener 258) is then run through the passage 262, which couples the domed safety hood 280 with the sprocket head 202 while maintaining the clamping force on the roller chain 208. The windows 284 enable the roller chain 208 to exit the domed safety hood at an angle, as required by the size of the pipe under repair.

Referring to FIG. 19, a top spanning safety hood 290 is depicted in a disclosed embodiment. The top spanning safety hood 290 includes a chassis 292 from which extends a bracket 294 that spans opposing sides of the chassis 292. The bracket 294 includes a flat, spanning portion 296 that traverses between the opposing sides of the chassis 292. The chassis 292 also includes structure that defines passages 262b for alignment with the passage 262a of the sprocket head 202. A pair of guides 298 are disposed on opposing sides of the chassis 292.

In operation, the pipe jack 200 is mounted to the pipe under repair and the roller chain 208 mounted to the sprocket head 202 as described above. The top spanning safety hood 290 is then placed over the sprocket head 202 so that the guides 298 straddle the support plate 214 of the sprocket head 202 and so that the chassis 292 rests on the support plate 214. The top spanning safety hood 290 can be brought into clamping contact with the roller chain 208 until the passages 262a and 262b are brought substantially into alignment. A pin (e.g., fastener 258) is then run through the passage 262, which couples the domed safety hood 280 with the sprocket head 202 while maintaining the clamping force on the roller chain 208 with the spanning portion 296.

Functionally, the guides 298 enable registration of the chassis 292 on the support plate 214. Also, the flat geometry of the spanning portion 296, properly dimensioned, can bend more readily than the arcuate guard plate(s) 282 of the domed safety hood 280 when brought into contact with the roller chain 208, thereby exerting effectively a spring-loaded clamping force onto the roller chain 208 that can require less force for the user to assemble.

Referring to FIG. 20, a dome-in-chassis safety hood 300 is depicted in a disclosed embodiment. The dome-in-chassis safety hood 300 includes many of the same attributes as the spanning safety hood 290, and, in one embodiment, includes the offset windows 284 of the domed safety hood 280. The dome-in-chassis safety hood 300 includes an arcuate guard plate 302 that is coupled to the chassis. The dome-in-chassis safety hood 300 can be dimensioned so that the arcuate guard plate 302 exerts a clamping force against the roller chain 208, as described in relation to FIG. 18A.

The various embodiments depicted herein present pairings of individual sprockets (e.g., sprockets 211a and 211b for arc sprocket pair 211). However, it is understood that the number of arc sprockets are not limited to even numbers for pairings. That is, the total number individual of arc sprockets on a given arc sprocket head can be an odd number.

The preceding should be read with reference to the drawings in which similar elements in different drawings are numbered the same. The drawings, which are not necessarily to scale, depict illustrative embodiments and are not intended to limit the scope of the disclosure. While the disclosed embodiments are amenable to various modifications and alternative forms, specifics thereof have been shown by way of example in the drawings and described in detail. It should be understood, however, that particular embodiments disclosed herein are not limiting. To the contrary, the intention is to cover all modifications, equivalents, and alternatives falling within the scope of the claims.

Various modifications to the embodiments may be apparent to one of skill in the art upon reading this disclosure. For example, persons of ordinary skill in the relevant art will recognize that the various features described for the different embodiments can be suitably combined, un-combined, and re-combined with other features, alone, or in different combinations.

Persons of ordinary skill in the relevant arts will recognize that the embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features, but rather may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

References to "embodiment(s)", "embodiment(s) of the disclosure", and "disclosed embodiment(s)" contained herein refer to the specification (text, including the claims, and figures) of this patent application that are not admitted prior art.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A pipe jack assembly kit, comprising:
 a sprocket head including a plurality of arc sprockets that extend from a first surface of a support plate, each of said plurality of arc sprockets including a plurality of radial projections, said sprocket head having a second surface opposite said first surface that is adapted to receive a ram plunger of a hydraulic jack;
 a base plate having a first surface that is adapted to receive a base portion of said hydraulic jack, said base plate including a second surface opposite said first surface adapted to interface with an exterior surface of one of a half sole repair sleeve and a pipe; and
 a roller chain for engagement with said radial projections of said arc sprockets.

2. The pipe jack assembly kit of claim 1, further comprising said hydraulic jack.

3. The pipe jack assembly kit of claim 1, wherein said plurality of arc sprockets includes an arc sprocket pair, wherein each individual arc sprocket of said arc sprocket pair is disposed on a separate respective plane, the separate respective planes being parallel to each other.

4. The pipe jack assembly kit of claim 1, wherein each of said plurality of arc sprockets define a linear chord, said linear chord being adjacent said first surface of said support plate.

5. The pipe jack assembly kit of claim 1, further comprising a receiving tube coupled with said second surface of said support plate, said receiving tube being adapted to receive said ram plunger of said hydraulic jack.

6. The pipe jack assembly kit of claim 1, wherein a bottom surface of said base plate is substantially arcuate.

7. The pipe jack assembly kit of claim 1, wherein a top surface of said base plate includes a plate receiver that defines a pocket, said pocket being dimensioned for receiving said base of said hydraulic jack.

8. The pipe jack assembly kit of claim 1, further comprising a hydraulic jack that is integral with at least one of said base plate and said sprocket head.

9. The pipe jack assembly kit of claim 1, wherein said plurality of arc sprockets include a first arc sprocket pair and a second arc sprocket pair, wherein each individual arc sprocket of said first arc sprocket pair and said second arc sprocket pair is disposed on a separate respective plane, the separate respective planes being parallel to each other.

10. The pipe jack assembly kit of claim 9, wherein said roll chain is a double roll chain.

11. The pipe jack assembly kit of claim 1, wherein a filler plate is disposed between adjacent ones of said plurality of arc sprockets.

12. The pipe jack assembly kit of claim 1, further comprising a safety hood selectively attachable to said sprocket head.

13. The pipe jack assembly kit of claim 12, wherein said safety hood is configured to capture said roller chain on said radial projections when said roller chain is engaged with said radial projections of said sprocket head.

14. The pipe jack assembly kit of claim 13, wherein said safety hood exerts a clamping force on said roller chain when said roller chain is engaged with said radial projections of said sprocket head.

15. The pipe jack assembly kit of claim 1, further comprising a half sole repair sleeve.

16. The pipe jack assembly kit of claim 1, further comprising means for exerting a clamping force on said roller chain when said roller chain is engaged with said radial projections of said sprocket head.

17. A method of repairing a pipe, comprising:
providing a sprocket head including a plurality of arc sprockets that extend from a first surface of a support plate, each of said plurality of arc sprockets including a plurality of radial projections, said sprocket head having a second surface opposite said first surface that is adapted to receive a ram plunger of a hydraulic jack;
providing a base plate having a first surface that is adapted to receive a base portion of said hydraulic jack, said base plate including a second surface opposite said first surface adapted to interface with an exterior surface of one of a half sole repair sleeve and a pipe;
providing a roller chain for engagement with said radial projections of said arc sprockets;
providing a set of instructions on a tangible medium, said instructions comprising:
mounting said base plate to said exterior surface of one of said pipe and a top half sole repair sleeve mounted on top of said pipe;
mounting a hydraulic jack atop said base plate; and
mounting said sprocket head onto a ram plunger of said hydraulic jack, said base, said hydraulic jack and said sprocket head comprising a pipe jack assembly.

18. The method of claim 17, wherein said instructions provided in the step of providing instructions further include:
placing a bottom half sole repair sleeve proximate a bottom portion of said pipe;
wrapping said roller chain at least partially around said pipe, said top half sole repair sleeve, said bottom half sole repair sleeve, and said pipe jack assembly;
attaching said roller chain to a first of said plurality of sprockets;
attaching said roller chain to a second of said plurality of sprockets; and
operating said hydraulic jack so that said roller chain exerts a force on said bottom half sole repair sleeve.

19. The method of claim 18, further comprising
providing a safety hood, wherein said instructions provided in the step of providing instructions further include:
securing said safety hood over said sprocket head such that said safety hood is in contact with said roller chain when said roller chain is engaged with said radial projections of said sprocket head.

\* \* \* \* \*